United States Patent [19]
Rehfuss et al.

[11] Patent Number: 5,474,811
[45] Date of Patent: Dec. 12, 1995

[54] COMPOSITE COLOR-PLUS-CLEAR COATING UTILIZING CARBAMATE-FUNCTIONAL POLYMER COMPOSITION IN THE CLEARCOAT

[75] Inventors: John W. Rehfuss, West Bloomfield; Donald L. St. Aubin, Westland, both of Mich.

[73] Assignee: BASF Corporation, Southfield, Mich.

[21] Appl. No.: 241,925

[22] Filed: May 11, 1994

Related U.S. Application Data

[63] Continuation of Ser. No. 965,577, Oct. 23, 1992, Pat. No. 5,356,669.

[51] Int. Cl.⁶ .................................................. B05D 1/36
[52] U.S. Cl. .................................. 427/407.1; 427/409
[58] Field of Search ........................ 427/388.3, 407.1, 427/409

[56] References Cited

U.S. PATENT DOCUMENTS

| | | | |
|---|---|---|---|
| 3,464,938 | 9/1969 | Nordstrom | 260/21 |
| 4,110,286 | 8/1978 | Vandegaer et al. | 260/29.2 TN |
| 4,154,891 | 5/1979 | Porter, Jr. et al. | 428/334 |
| 4,308,184 | 12/1981 | Thoma et al. | 260/29.2 TN |
| 4,520,167 | 5/1985 | Blank et al. | 525/131 |
| 4,543,276 | 9/1985 | Parekh | 427/409 |
| 4,677,168 | 6/1987 | Hoy et al. | 525/441 |
| 5,098,947 | 3/1992 | Metzger et al. | 524/507 |
| 5,300,328 | 4/1994 | Rehfuss | 427/388.3 |
| 5,336,566 | 8/1994 | Rehfuss | 428/524 |
| 5,356,669 | 10/1994 | Rehfuss et al. | 427/407.1 |
| 5,412,049 | 5/1995 | Argyropoulos et al. | 526/312 |

FOREIGN PATENT DOCUMENTS

| | | | |
|---|---|---|---|
| 0257848 | 3/1988 | European Pat. Off. | |
| 0365098 | 4/1990 | European Pat. Off. | C09D 133/14 |
| WO94/10212 | 10/1992 | European Pat. Off. | C08F 8/30 |
| WO94/10211 | 10/1992 | European Pat. Off. | C08F 8/30 |
| WO94/10213 | 10/1992 | European Pat. Off. | C08F 8/30 |
| 3634780C2 | 10/1986 | Germany | C09D 201/06 |
| 2148907 | of 0000 | United Kingdom | |
| WO8700851 | 2/1987 | WIPO | |

*Primary Examiner*—Diana Dudash
*Attorney, Agent, or Firm*—Anne Gerry Sabourin

[57] ABSTRACT

A method of producing an article with a color-plus-clear composite coating is described. The method comprises the steps of applying a colored coating composition to a substrate, and applying a clear coating composition over the colored coating composition, wherein the clear coating composition is a curable coating composition comprising:

(a) a first component comprising a polymer backbone having appended thereto at least one carbamate functional group, and (b) a second component comprising a compound having a plurality of functional groups that are reactive with said carbamate group.

15 Claims, No Drawings

COMPOSITE COLOR-PLUS-CLEAR COATING UTILIZING CARBAMATE-FUNCTIONAL POLYMER COMPOSITION IN THE CLEARCOAT

This is a continuation of application Ser. No. 07/965,577 filed on Oct. 23, 1992, now U.S. Pat. No. 5,356,669.

FIELD OF THE INVENTION

This invention relates to composite color-plus-clear coatings and methods, especially compositions for the clearcoat of such coatings.

BACKGROUND OF THE INVENTION

Color-plus-clear composite coatings are widely utilized in the coatings art. They are particularly desirable where exceptional gloss, depth of color, distinctness of image, or special metallic effects are desired. The automotive industry has made extensive use of color-plus-clear composite coatings for automotive body panels. Such coatings, however, require an extremely high degree of clarity in the clearcoat to achieve the desired visual effect. As such, the clearcoat of a color-plus-clear composite coating is especially susceptible to a phenomenon known as environmental etch. Environmental etch manifests itself as spots or marks on or in the clear finish of the coating that often cannot be rubbed out.

It is often difficult to predict the degree of resistance to environmental etch that a clearcoat will exhibit. Many coating compositions known for their durability and/or weatherability when used in exterior paints, such as high-solids enamels, do not provide the desired level of resistance to environmental etch when used as the clearcoat of a color-plus-clear composite coating.

Many compositions have been proposed for use as the clearcoat of a color-plus-clear composite coating, such as polyurethanes, acid-epoxy systems and the like. However, many prior art systems suffer from disadvantages such as coatability problems, compatibility problems with the pigmented basecoat, solubility problems. Moreover, very few one-pack coating compositions have been found that provide satisfactory resistance to environmental etch, especially in the demanding environment of automotive coatings. Thus, there exists a continuing need for curable coating compositions that provide satisfactory resistance to environmental etch when used as the clearcoat of a color-plus-clear composite coating.

SUMMARY OF THE INVENTION

It has now been discovered that carbamate-functional acrylic polymers can be used in the clearcoat composition of a color-plus-clear composite coating. Thus, according to the present invention, there is provided a method of applying a color-plus-clear composite coating comprising the steps of applying a colored coating composition to a substrate, and applying a clear coating composition over the colored coating composition, wherein the clear coating composition is a curable coating composition comprising:

(a) a first component comprising a polymer backbone having appended thereto at least one carbamate functional group, and (b) a second component comprising a compound having a plurality of functional groups that are reactive with said carbamate group.

The composite coating, when cured, provides a hard but flexible, durable, attractive clearcoat finish that is highly resistant to environmental etch. The clearcoat composition can be effectively applied as a one-pack system without the necessity of mixing reactive materials just prior to application as in a two-pack system.

DESCRIPTION OF THE PREFERRED EMBODIMENTS

The polymer component (a) used in the composition of the invention can be prepared in a variety of ways. One way to prepare such polymers is to prepare an acrylic monomer having a carbamate functionality in the ester portion of the monomer. Such monomers are well-known in the art and are described, for example in U.S. Pat. Nos. 3,479,328, 3,674,838, 4,126,747, 4,279,833, and 4,340,497, the disclosures of which are incorporated herein by reference. One method of synthesis involves reaction of a hydroxy ester with urea to form the carbamyloxy carboxylate (i.e., carbamate-modified acrylic). Another method of synthesis reacts an $\alpha,\beta$-unsaturated acid ester with a hydroxy carbamate ester to form the carbamyloxy carboxylate. Yet another technique involves formation of a hydroxyalkyl carbamate by reacting a primary or secondary amine or diamine with a cyclic carbonate such as ethylene carbonate. The hydroxyl group on the hydroxyalkyl carbamate is then esterified by reaction with acrylic or methacrylic acid to form the monomer. Other methods of preparing carbamate-modified acrylic monomers are described in the art, and can be utilized as well. The acrylic monomer can then be polymerized along with other ethylenically-unsaturated monomers, if desired, by techniques well-known in the art.

An alternative route for preparing the polymer (a) used in the composition of the invention is to react an already-formed polymer such as an acrylic polymer with another component to form a carbamate-functional group appended to the polymer backbone, as described in U.S. Pat. No. 4,758,632, the disclosure of which is incorporated herein by reference. One technique for preparing polymers useful as component (a) involves thermally decomposing urea (to give off ammonio and HNCO) in the presence of a hydroxy-functional acrylic polymer to form a carbamate-functional acrylic polymer. Another technique involves reacting the hydroxyl group of a hydroxyalkyl carbamate with the isocyanate group of an isocyanate-functional acrylic or vinyl monomer to form the carbamate-functional acrylic. Isocyanate-functional acrylics are known in the art and are described, for example in U.S. Pat. No. 4,301,257, the disclosure of which is incorporated herein by reference. Isocyanate vinyl monomers are well-known in the art and include unsaturated m-tetramethyl xylene isocyanate (sold by American Cyanamid as TMI®). Yet another technique is to react the cyclic carbonate group on a cyclic carbonate-functional acrylic with ammonia in order to form the carbamate-functional acrylic. Cyclic carbonate-functional acrylic polymers are known in the art and are described, for example, in U.S. Pat. No. 2,979,514, the disclosure of which is incorporated herein by reference. A more difficult, but feasible way of preparing the polymer would be to transesterify an acrylate polymer with a hydroxyalkyl carbamate.

The polymer (a) will generally have a molecular weight of 2000–20,000, and preferably from 4000–6000. Molecular weight can be determined by the GPC method using a polystyrene standard. The carbamate content of the polymer, on a molecular weight per equivalent of carbamate functionality, will generally be between 200 and 1500, and preferably between 300 and 350. The glass transition temperature, $T_g$, of components (a) and (b) can be adjusted to achieve a cured coating having the $T_g$ for the particular application involved. The average $T_g$ of unreacted components (a) and (b) should be between 10° C. and 80° C., with the individual $T_g$'s being adjusted to achieve optimum performance.

The polymer component (a) can be represented by the randomly repeating units according to the following formula:

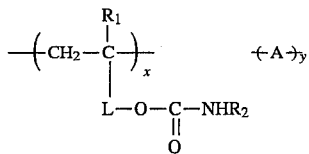

In the above formula, $R_1$ represents H or $CH_3$. $R_2$ represents H, alkyl, preferably of 1 to 6 carbon atoms, or cycloalkyl, preferably up to 6 ring carbon atoms. It is to be understood that the terms alkyl and cycloalkyl are to include substituted alkyl and cycloalkyl, such as halogen-substituted alkyl or cycloalkyl. Substituents that will have an adverse impact on the properties of the cured material, however, are to be avoided. For example, ether linkages are thought to be susceptible to hydrolysis, and should be avoided in locations that would place the ether linkage in the crosslink matrix. The values x and y represent weight percentages, with x being 10 to 90% and preferably 40 to 60%, and y being 90 to 10% and preferably 60 to 40%.

In the formula, A represents repeat units derived from one or more ethylenically unsaturated monomers. Such monomers for copolymerization with acrylic monomers are known in the art. They include alkyl esters of acrylic or methacrylic acid, e.g., ethyl acrylate, butyl acrylate, 2-ethylhexyl acrylate, butyl methacrylate, isodecyl methacrylate, hydroxyethyl methacrylate, hydroxypropyl acrylate, and the like; and vinyl monomers such as unsaturated m-tetramethyl xylene isocyanate (sold by American Cyanamid as TMI®), styrene, vinyl toluene and the like.

L represents a divalent linking group, preferably an aliphatic of 1 to 8 carbon atoms, cycloaliphatic, or aromatic linking group of 6 to 10 carbon atoms. Examples of L include

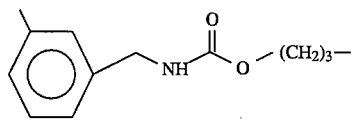

$—(CH_2)—$, $—(CH_2)_2—$, $—(CH_2)_4—$, and the like. In one preferred embodiment, —L— is represented by —COO—L'— where L' is a divalent linking group. Thus, in a preferred embodiment of the invention, the polymer component (a) is represented by randomly repeating units according to the following formula:

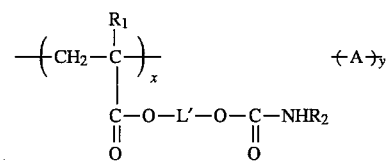

In this formula, $R_1$, $R_2$, A, x, and y are as defined above. L' may be a divalent aliphatic linking group, preferably of 1 to 8 carbon atoms, e.g., $—(CH_2)—$, $—(CH_2)_2—$, $—(CH_2)_4—$, and the like, or a divalent cycloaliphatic linking group, preferably up to 8 carbon atoms, e.g., cyclohexyl, and the like. However, other divalent linking groups can be used, depending on the technique used to prepare the polymer. For example, if a hydroxyalkyl carbamate is adducted onto an isocyanate-functional acrylic polymer, the linking group L' would include an —NHCOO— urethane linkage as a residue of the isocyanate group.

The composition of the invention is cured by a reaction of the carbamate-functional polymer component (a) with a component (b) that is a compound having a plurality of functional groups that are reactive with the carbamate groups on component (a). Such reactive groups include active methylol or methylalkoxy groups on aminoplast crosslinking agents or on other compounds such as phenol/formaldehyde adducts, isocyanate groups, siloxane groups, cyclic carbonate groups, and anhydride groups. Examples of (b) compounds include melamine formaldehyde resin (including monomeric or polymeric melamine resin and partially or fully alkylated melamine resin), urea resins (e.g., methylol ureas such as urea formaldehyde resin, alkoxy ureas such as butylated urea formaldehyde resin), polyanhydrides (e.g., polysuccinic anhydride), and polysiloxanes (e.g., trimethoxy siloxane). Aminoplast resin such as melamine formaldehyde resin or urea formaldehyde resin are especially preferred. Even more preferred are aminoplast resins where one or more of the amino nitrogens is substituted with a carbamate group for use in a process with a curing temperature below 150° C., as described in the concurrently-filed U.S. patent application entitled "Carbamate-Defunctionalized Aminoplast Curing for Polymer Compositions" in the names of John W. Rehfuss and Donald L. St. Aubin.

A solvent may optionally be utilized in the clearcoat composition used in the practice of the present invention. Although the composition used according to the present invention may be utilized, for example, in the form of substantially solid powder, or a dispersion, it is often desirable that the composition is in a substantially liquid state, which can be accomplished with the use of a solvent. This solvent should act as a solvent with respect to both the carbamate-functional polymer (a) as well as the component (b). In general, depending on the solubility characteristics of components (a) and (b), the solvent can be any organic solvent and/or water. In one preferred embodiment, the solvent is a polar organic solvent. More preferably, the solvent is a polar aliphatic solvents or polar aromatic solvents. Still more preferably, the solvent is a ketone, ester, acetate, aprotic amide, aprotic sulfoxide, or aprotic amine. Examples of useful solvents include methyl ethyl ketone, methyl isobutyl ketone, m-amyl acetate, ethylene glycol butyl ether-acetate, propylene glycol monomethyl ether acetate, xylene, N-methylpyrrolidone, or blends of aromatic hydrocarbons. In another preferred embodiment, the solvent is water or a mixture of water with small amounts of aqueous co-solvents.

The clearcoat composition used in the practice of the invention may include a catalyst to enhance the cure reaction. For example, when aminoplast compounds, especially monomeric melamines, are used as component (b), a strong acid catalyst may be utilized to enhance the cure reaction. Such catalysts are well-known in the art and include, for example, p-toluenesulfonic acid, dinonylnaphthalene disulfonic acid, dodecylbenzenesulfonic acid, phenyl acid phosphate, monobutyl maleate, butyl phosphate, and hydroxy phosphate ester. Other catalysts that may be useful in the composition of the invention include Lewis acids, zinc salts, and tin salts.

In a preferred embodiment of the invention, the solvent is present in the clearcoat composition in an amount of from about 0.01 weight percent to about 99 weight percent, preferably from about 10 weight percent to about 60 weight percent, and more preferably from about 30 weight percent to about 50 weight percent.

Coating compositions can be coated on the article by any of a number of techniques well-known in the art. These include, for example, spray coating, dip coating, roll coating, curtain coating, and the like. For automotive body panels, spray coating is preferred.

Pigmented basecoat compositions for such composite coatings are well-known in the art, and do not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. In one preferred embodiment of the invention, the basecoat composition also utilizes a carbamate-functional acrylic polymer. Basecoat polymers are preferably crosslinkable, and thus comprise one or more type of crosslinkable functional groups. Such groups include, for example, hydroxy, isocyanate, amine, epoxy, acrylate, vinyl, silane, and acetoacetate groups. These groups may be masked or blocked in such a way so that they are unblocked and available for the cross-linking reaction under the desired curing conditions, generally elevated temperatures. Useful cross-linkable functional groups include hydroxy, epoxy, acid, anhydride, silane, and acetoacetate groups. Preferred cross-linkable functional groups include hydroxy functional groups and amino functional groups.

Basecoat polymers may be self-cross-linkable, or may require a separate cross-linking agent that is reactive with the functional groups of the polymer. When the polymer comprises hydroxy functional groups, for example, the cross-linking agent may be an aminoplast resin, isocyanate and blocked isocyanates (including isocyanurates), and acid or anhydride functional cross-linking agents.

After an article is coated with the above-described layers, the composition is subjected to conditions so as to cure the coating layers. Although various methods of curing may be used, heat-curing is preferred. Generally, heat curing is effected by exposing the coated article to elevated temperatures provided primarily by radiative heat sources. Curing temperatures will vary depending on the particular blocking groups used in the cross-linking agents, however they generally range between 93° C. and 177° C., and are preferably between 121° C. and 141° C. The curing time will vary depending on the particular components used, and physical parameters such as the thickness of the layers, however, typical curing times range from 15 to 60 minutes.

The invention is further described in the following examples.

PREPARATION 1—CARBAMATE-FUNCTIONAL ACRYLIC

A three-necked 5-1 round bottom flask was fitted with an agitator at the center neck and a thermal couple at one of the side necks to monitor the reaction temperature. A nitrogen purge line was also fed through this neck. The second side neck was fitted with a Claissen adaptor and water cooled condenser.

198 g Urethane-grade mixed aromatics solvent (Solvesso® 100) and 225 g urethane-grade toluene were charged to the flask. The mixture was agitated and heated to reflux with a nitrogen purge. As the mixture reached reflux temperature, 127° C., the nitrogen purge was discontinued.

923 g TMI® (unsaturated m-tetramethyl xylene isocyanate, American Cyanamid), 692 g ethyl hexyl acrylate and 269 g of a 50% solution of t-butyl peracetate in odorless mineral spirits were charged to a separate container. This mixture was pumped to the refluxing solvents over a period of 3.5 hour. At the conclusion of this first feed, a second addition of 27 g of the t-butyl peracetate solution and 27 g urethane grade mixed aromatics were charged over 30 minutes. 8.2 g Urethane-grade mixed aromatics was flushed through the pump and into the reaction mixture after the second initiator feed. The reaction mixture was then held at reflux, 135° C. for one hour.

After this hold period, the batch was cooled to 70° C. 1.1 g Dibutyltin dilaurate was charged and mixed into the batch for five minutes. At this point, 565 g hydroxypropyl carbamate was charged to the reaction mixture over 30 minutes. The batch was then slowly heated to 100° C. and held at this temperature until isocyanate functionality had disappeared as determined by infrared spectroscopy or titration. Upon the disappearance of the isocyanate, 852 g monobutyl ether of ethylene glycol was charged to the vessel and allowed to homogenize. The heat to the reaction was turned off and the carbamate functional acrylic was removed from the vessel.

PREPARATION 2—CARBAMATE-MODIFIED MELAMINE

A three-necked 5-1 round-bottomed flask was fitted with a vacuum sealed agitator at the center neck and a thermocouple at a side neck to monitor the reaction temperature. The second side neck as temporarily fitted with a water cooled condensor. Vacuum was applied through a collecting vessel and supercooled condensor via this side neck of the reaction flask.

1708 g Hexamethoxylated monomeric melamine and 1044 g butyl carbamate were charged to the flask. The mixture was homogenized with agitation while heating slowly to 60° C. As the mixture reached 60° C., 1.2 g dodecylbenzyl sulfonic acid was charged to the vessel. The condensor was removed and the flask fitted to the vacuum set-up. The mixture was heated to 100° C. at a rate of 1° C./min. When the mixture reached 70° C., 15–20" vacuum was applied. The methanol was collected as it condensed in the supercooled condensor. A stoichiometric amount of methanol, 279 g, was removed in 2.5 hours at 25" vacuum and 100° C. After this amount was removed, the heat and vacuum were discontinued. The vessel was charge with 433 g xylene, homogenized, and carbamate-modified melamine separated from the mixture.

EXAMPLE 1

A clear coating composition was prepared by combining the following materials:

665 g carbamated acrylic (Preparation 1)

167 g carbamated melamine (Preparation 2)

345 g butyl acetate 44 g Exxate® 800 (methyl octoate isomers)

19 g Tinuvin® 384B 6 g Tinuvin® 123

12 g 25% active oxizolidine blocked dodecylbenzyl sulfonic acid

The coating composition was sprayed over steel panels that had been previously sprayed with an acrylic pigmented base coat and flashed. Viscosity was adjusted to seconds with butyl acetate. The panels were baked 10 minutes at 82° C. and 20 minutes at 132° C.

Film builds:

basecoat 15 μm clearcoat 51 μm

Tukon hardness 13.5

MEK rubs 200, slight scoring

The panel of Example i was subjected to 16 weeks of severe weathering conditions in Jacksonville, Fla., and exhibited significantly reduced environmental etch versus comparison panels coated having clearcoats of hydroxyl-functional acrylic polymer cross-linked with melamine.

EXAMPLE 2

A clear coating composition was prepared by combining the following materials:

184 g carbamated acrylic (Preparation 1)

60 g hexamethoxylated monomeric melamine 130 g butyl acetate 14 g butyl cellosolve acetate 6 g Tinuvin® 384B 1.9 g Tinuvin® 123

3.8 g 25% active oxizolidine blocked dodecylbenzyl sulfonic acid

The coating composition was sprayed over steel panels that had been previously sprayed with an acrylic pigmented basecoat and flashed. Viscosity was adjusted to 20 seconds with butyl acetate. The panels were baked 10 minutes at 82° C. and 20 minutes at 132° C.

Film builds:

basecoat 15 μm clearcoat 58 μm

The panel of Example 2 was subjected to 16 weeks of severe weathering conditions in Jacksonville, Fla., and exhibited significantly reduced environmental etch versus comparison panels coated having clearcoats of hydroxyl-functional acrylic polymer cross-linked with melamine.

PREPARATION
3—CARBAMATE-FUNCTIONAL ACRYLIC

A three-necked 5-1 round bottom flask was fitted with an agitator at the center neck and a thermal couple to monitor the reaction temperature at one of the side necks. A nitrogen purge/sparge line was also fed through this neck. The second side neck was fitted with a Claissen adaptor and water-cooled condenser.

235 g Xylene and 356 g amyl acetate were charged to the flask. The mixture was agitated and heated to reflux with a nitrogen purge. As the mixture reached reflux, 143° C., the nitrogen purge was discontinued. 301 g Styrene, 196 g ethylhexyl acrylate, 337 g ethylhexyl methacrylate 445 g hydroxyethyl methacrylate, 226 g cyclohexyl methacrylate, 123 g of a 50% solution of t-butyl peracetate in odorless mineral spirits, and 116 g xylene were charged to a separate container. This mixture was pumped to the refluxing solvent over a period of four hours. At the conclusion of this feed, 35 g xylene was added through the pump and into the reaction mixture. The reaction mixture was held at reflux, 140° C., for one hour.

The mixture was cooled to 120° C. and charged with 205 g urea. The temperature dropped as the urea dissolved. The reaction mixture was slowly heated to 150° C. and held for the remainder of the synthesis.

The vessel was then charged with 2 g of King Industry catalyst Nacure® XP-348 (metal carbalate). At this point, the reaction was sparged with nitrogen to facilitate the evacuation of ammonia formed from the thermal decomposition of the urea.

Incremental additions of the catalyst (0.5 g) were added once an hour. The reaction was monitored for the disappearance of hydroxyl by titration. When no hydroxyl was detected by titration, the nitrogen sparge and heat were cut, and 560 g methyl isobutyl ketone was added to the mixture. The mixture was homogenized, followed by separation of the polymer.

EXAMPLE 3

A coating composition was formed by blending 50 g of the carbamate-functional acrylic from Preparation 3, 7.7 g hexamethoxylated monomeric melamine, and 0.6 g oxizolidine-blocked dodecylbenzyl sulfonic acid. The composition was coated onto a glass plate, followed by vacuum drawdown to form an 200 μm-thick layer. The cured coating was baked at 132° C. for 30 minutes. The coating passed a test of 200 MEK rubs.

The invention has been described in detail with reference to preferred embodiments thereof. It should be understood, however, that variations and modifications can be made within the spirit and scope of the invention.

What is claimed is:

1. A method of producing a color-plus-clear composite coating on a substrate comprising the steps of applying a colored coating composition to said substrate, and applying a clear coating composition over the colored coating composition, wherein the clear coating composition is a curable coating composition comprising, in an organic solvent medium:

(a) a first component comprising a polymer backbone having appended thereto at least one carbamate functional group, said first component represented by randomly repeating units according to the formula:

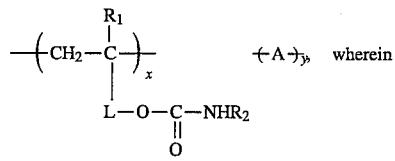

wherein $R_1$ represents H or $CH_3$, $R_2$ represents H, alkyl, or cycloalkyl,

L represents a divalent linking group,

A represents repeat units derived from one or more ethylenically unsaturated monomers, x represents 10 to 90 weight %, and y represents 90 to 10 weight %, and (b) a second component comprising a compound having a plurality of functional groups that are reactive with said carbamate group.

2. A method according to claim 1 wherein said ethylenically unsaturated monomers comprise a carbamate group.

3. A method according to claim 1 wherein said ethylenically unsaturated monomers comprise one or more acrylic monomers.

4. A method according to claim 3 wherein said acrylic monomers comprise a carbamate group.

5. A method according to claim 1 wherein 10–90% of said ethylenically unsaturated monomers are acrylic monomers.

6. A method according to claim 1 wherein component (b) is selected from the group consisting of aminoplast resin, polysiloxanes, polyanhydrides, and compounds having a plurality of active methylol functional groups.

7. A method according to claim 1 wherein component (b) is an aminoplast resin.

8. A method according to claim 7 wherein said aminoplast resin is melamine formaldehyde resin.

9. A method according to claim 8 wherein said melamine formaldehyde resin is fully or partially alkylated.

10. A method according to claim 1 wherein $R_1$ represents $CH_3$.

11. A method according to claim 1 wherein x represents 40 to 60 weight % and y represents 60 to 40 weight %.

12. A method according to claim 1 wherein —L— is represented by the formula —COO—L'— where L' is a divalent linking group.

13. A method according to claim 1 wherein $R_2$ represents H.

14. A method according to claim 1 wherein $R_2$ represents alkyl or cycloalkyl.

15. A method according to claim 1 wherein said substrate is an automobile body panel.

* * * * *